United States Patent
Bolte et al.

(10) Patent No.: US 9,363,226 B2
(45) Date of Patent: Jun. 7, 2016

(54) METHOD FOR DOUBLE IP ADDRESS RECOVERY

(71) Applicant: International Business Machines Corporation, Armonk, NY (US)

(72) Inventors: Dirk Bolte, Birkenfeld (DE); Yaroslav Chernov, Moscow (RU); Victor Gusev, Astrakhan (RU); Alexander Kuchin, Moscow (RU); Martin Kuenzel, Vaihingen an der Enz (DE); Adolf Martens, Weil im Schoenbuch (DE); Andrey Mishin, Moscow (RU); Dmitry Moor, Moscow (RU)

(73) Assignee: International Business Machines Corporation, Armonk, NY (US)

( * ) Notice: Subject to any disclaimer, the term of this patent is extended or adjusted under 35 U.S.C. 154(b) by 197 days.

(21) Appl. No.: 14/018,714

(22) Filed: Sep. 5, 2013

(65) Prior Publication Data
US 2015/0067120 A1    Mar. 5, 2015

(51) Int. Cl.
- G06F 15/16 (2006.01)
- H04L 29/12 (2006.01)
- H04L 12/24 (2006.01)

(52) U.S. Cl.
CPC ........ H04L 61/2007 (2013.01); H04L 41/0873 (2013.01); H04L 41/50 (2013.01); H04L 61/2046 (2013.01); H04L 61/2092 (2013.01); H04L 41/0853 (2013.01)

(58) Field of Classification Search
None
See application file for complete search history.

(56) References Cited

U.S. PATENT DOCUMENTS

| | | | |
|---|---|---|---|
| 7,200,649 B1 * | 4/2007 | Batke et al. | 709/222 |
| 7,633,855 B2 | 12/2009 | Singh et al. | |
| 8,385,230 B2 | 2/2013 | Kuehnel et al. | |
| 9,143,929 B1 * | 9/2015 | Chen | H04W 8/265 |
| 2002/0023210 A1 * | 2/2002 | Tuomenoksa et al. | 713/161 |
| 2006/0235997 A1 * | 10/2006 | Munirajan et al. | 709/245 |
| 2007/0097992 A1 * | 5/2007 | Singh | H04L 29/12216 |
| | | | 370/395.54 |
| 2008/0177884 A1 * | 7/2008 | Agarwal | H04L 1/1841 |
| | | | 709/227 |
| 2009/0198800 A1 * | 8/2009 | Dighe et al. | 709/221 |
| 2012/0131197 A1 * | 5/2012 | Prentice et al. | 709/226 |
| 2012/0144199 A1 | 6/2012 | Hamachi | |
| 2012/0317252 A1 * | 12/2012 | Vemulapalli | H04L 61/2046 |
| | | | 709/221 |

* cited by examiner

Primary Examiner — Thomas Dailey
(74) Attorney, Agent, or Firm — Edward P. Li

(57) ABSTRACT

A computer-implemented method, computer program product, and computer system for double IP address recovery. Double IP address is a situation of a same IP address for different hosts in a network, and the double IP address recovery resolves the double IP address. In the invention, the hosts exchanges rules and system state information. Each of the hosts determines its own action of the double IP address recovery based on the same rules and the system state information of the different hosts. Each of the hosts executes its own action, either to continue or to alter an IP address.

5 Claims, 7 Drawing Sheets

FIG. 3A

| Offsets | Byte | 0 | | 1 | | 2 | 3 | | 4 | | 5 | 6 | | 7 | | 8 | 9 | | 10 | | 11 | 12 | 13 | 14 | 15 | 16 | 17 | 18 | 19 | 20 |
|---|---|---|---|---|---|---|---|---|---|---|---|---|---|---|---|---|---|---|---|---|---|---|---|---|---|---|---|---|---|---|---|
| | Nibble | 0 | 1 | 2 | 3 | 4 | 5 | 6 | 7 | 8 | 9 | 10 | 11 | 12 | 13 | 14 | 15 | 16 | 17 | 18 | 19 | 20 | 21 22 23 | 24 25 26 27 28 29 30 31 | 32 33 34 35 | 36 37 38 39 | 40 41 |
| | | version | Packet type | Packet Identifier | | | Byte offset Rules | | Byte length Rules | | Byte offset States | | Byte length States | | Unique Host Identifier | | | | Host IP | |

FIG. 3B

| Offsets | Byte | 0 | | 1 | |
|---|---|---|---|---|---|
| | Nibble | 0 | 1 | | |
| | | Rule length | | | |

| Offsets | Byte | 0 | | 1 | | 2 | | 3 | |
|---|---|---|---|---|---|---|---|---|---|
| | Nibble | 0 | 1 | 2 | 3 | | | | |
| | | Rule Entry Type Recovery | | Recovery Host 0 | | Recovery Host 1 | | | |

| Offsets | Byte | 0 | | 1 | | 2 | | 3 | | 4 | | 5 | | 6 | | 7 |
|---|---|---|---|---|---|---|---|---|---|---|---|---|---|---|---|---|
| | Nibble | 0 | 1 | 2 | 3 | | | | | | | | | | | |
| | | Rule Entry Type State Compare | | State Field | | Host 0 value | | | | Host 1 value | | | | | | |

| Offsets | Byte | 0 | | 1 | | 2 | | 3 | | 4 | | 5 | |
|---|---|---|---|---|---|---|---|---|---|---|---|---|---|
| | Nibble | 0 | 1 | 2 | 3 | | | | | | | | |
| | | Rule Entry Type Value Compare | | State Field | | Comparison operator | | | | | | | |

FIG. 3C

| Offsets | Byte | 0 | | 1 | | 2 | | 3 | | 4 | | 5 | | 6 | | 7 | | 8 | | 9 | | 10 | | 11 | |
|---|---|---|---|---|---|---|---|---|---|---|---|---|---|---|---|---|---|---|---|---|---|---|---|---|---|
| | Nibble | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
| | | State length | | Value | | | | | | | | | | Fuzziness | | | | | | State identifier | | | | | |

Note: state identifier can be of any length (terminated by \0), actual length is also derived from state length

FIG. 3D

| Offsets | Byte | 0 | | 1 | | 2 | | 3 | | 4 | | 5 | | 6 | | 7 | | 8 | | 9 | | 10 | | 11 | | 12 | | 13 | | 14 | | 15 | | 16 | | 17 | | 18 | | 19 | | 20 | |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| | Nibble | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 | 40 | 41 |
| 0/0 | | 7 | | BROADCAST | | | | 4320 | | | | 21 | | | | 13 | | | | 30 | | | | 34 | | | | AA:BB:CC:DD:EE:FF | | | | | | | | | | | | 192.168.0.1 | | |
| 21 | | 14 | | STATE | | | | 1 | | | | 1 | | | | 0 | | RECOVERY CONTINUE REBOOT | | | | 2 smaller than | | | | VALUE 9 | | | | RECOVERY CONTINUE REBOOT | | | | 0 | | | | | | | | | | | | | |
| 34 | | | | | | | | 1 | | | | 0 | | | | | | r | | o | | l | | e | | 16 | | | | 104367 | | | | | | 200 | | | | u | | p | | t | | i | | m | | e | | \0 | |

METHOD FOR DOUBLE IP ADDRESS RECOVERY

FIELD OF THE INVENTION

The present invention relates generally to computer networks, and more particularly to a computer-implemented method for double IP address recovery by which a situation of a same IP address for different hosts is resolved.

BACKGROUND

In a computer network, a centralized IP assignment uses a network protocol such as Dynamic Host Configuration Protocol (DHCP) to configure devices (or hosts) that are connected to the network and thus enable the hosts to communicate on the network. The centralized IP assignment involves clients and a server operating in a client-server model. However, in a network with non-centralized IP assignment (for example, no DHCP server or no configuration for specific hosts), a situation of a same IP address (double IP address) for different hosts may occur. For example, this situation may occur in high availability clusters, and may also occur when a protocol such as Bonjour® (which is Apple®'s implementation of zero configuration networking) with a limited IP range is used. Under this situation, a controlled IP recovery must be conducted in the network. The IP recovery can not always rely on a watchdog device. If the watchdog device is addressed by an IP address, the watchdog device is not an option for IP recovery. The watchdog device can not be used in some environments such as an embedded environment.

BRIEF SUMMARY

Embodiments of the present invention provide a computer-implemented method, computer program product, and computer system for double IP address recovery. Double IP address is a situation of a same IP address for a first host and a second host, and the double IP address recovery resolves the double IP address.

The first host in a network generates a packet which includes rules of the double IP address recovery and system state information of the first host. The first host broadcasts the packet to the second host. The first host receives, from the second host, a reply which includes system state information of the second host. The first host determines whether the double IP address is detected. In response to determining that the double IP address is detected, the first host determines an action of the double IP address recovery on the first host, based on the rules of the double IP address recovery and the system state information of the first and second hosts. The first host executes the action on the first host.

The second host in the network receives the packet which is broadcasted by the first host and extracts from the packet the rules of the double IP address recovery and the system state information of the first host. The second host generates an answer packet, which includes the system state information of the second host. The second host sends to the first host the reply, which includes the answer packet. The second host determines whether the double IP address is detected. In response to determining that the double IP address is detected, the second host determines an action of the double IP address recovery on the second host, based on the rules of the double IP address recovery and the system state information of the first and second hosts. The second host executes the action on the second host.

BRIEF DESCRIPTION OF THE SEVERAL VIEWS OF THE DRAWINGS

FIG. 3A shows a packet header in a packet generated by a double IP address recovery program, in accordance with an exemplary embodiment of the present invention.

FIG. 3B shows a rule format included in a packet generated by a double IP address recovery program, in accordance with an exemplary embodiment of the present invention.

FIG. 3C shows a format of system state information in a packet generated by a double IP address recovery program, in accordance with an exemplary embodiment of the present invention.

FIG. 3D shows an example of a packet generated by a double IP address recovery program, in accordance with an exemplary embodiment of the present invention.

DETAILED DESCRIPTION

Figure 1:
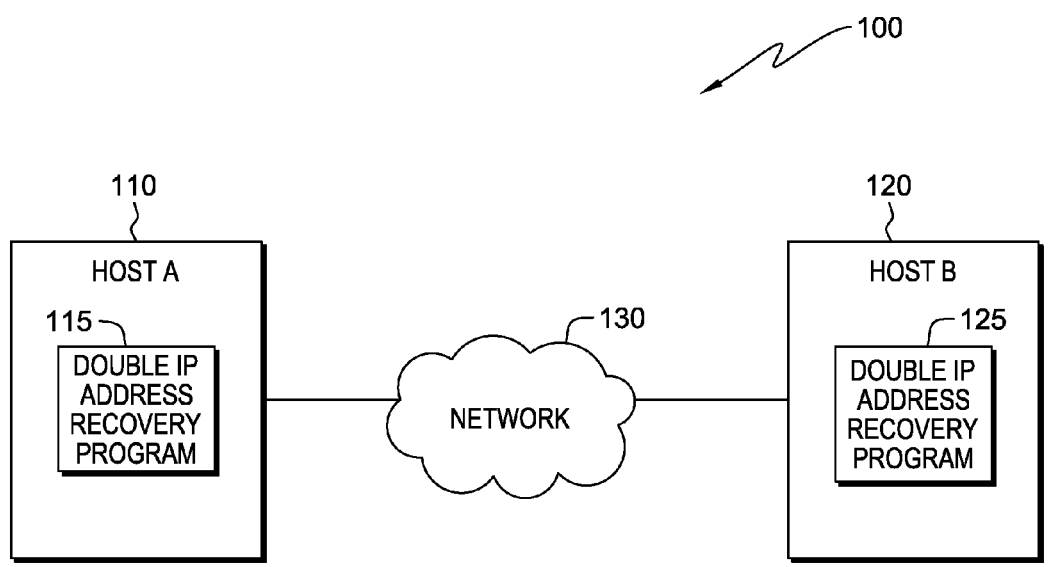
FIG. 1 is a diagram illustrating an exemplary system including host A and host B which are connected by a network, in accordance with an exemplary embodiment of the present invention.

FIG. 1 is a diagram illustrating exemplary system 100 including host A 110 and host B 120 which are connected by network 130, in accordance with an exemplary embodiment of the present invention. Host A 110 comprises double IP address recovery program 115, and host B 120 comprises double IP address recovery program 125. Double IP address recovery program 115 on host A 110 and double IP address recovery program 125 on host B 120 are responsible for detecting double IP address which is a situation of a same IP address for both host A 110 and host B 120. Double IP address recovery program 115 on host A 110 and double IP address recovery program 125 on host B 120 are further responsible for determining actions of double IP address recovery and executing the actions, in response to determining that the double IP address is detected. FIG. 1 only shows two hosts in the exemplary embodiment; however, it should be noted that a system of double IP address recovery may include multiple hosts, and each of the multiple hosts includes a double IP address recovery program such as double IP address recovery program 115 or double IP address recovery program 125.

Referring to FIG. 1, in the exemplary embodiment, host A 110 or host B 120 may be a desktop computer, a notebook/laptop computer, a tablet computer, a smartphone, a thin client, or any other computing device capable of receiving data from and sending data to other computers. In the exemplary embodiment, network 130 may include wired, wireless, or fiber optic connections. In exemplary embodiment, network 130 may be implemented as an intranet, a local area network (LAN), or a wide area network (WAN). In general, network 130 can be any combination of connections and protocols which support communications between host A 110 and host B 120.

Referring to FIG. 1, in the exemplary embodiment, double IP address recovery program 115 on host A 110 and double IP address recovery program 125 on host B 120 exchange rules and system state information of host A 110 and host B 120. Based on the rules, double IP address recovery program 115 on host A 110 and double IP address recovery program 125 on host B 120 determine actions of double IP address recovery on respective host A 110 and host B 120. Double IP address recovery program 115 and double IP address recovery program 125 execute their own actions on respective host A 110 and host B 120. For example, one of the hosts continues with the current IP address without further action, while the other one of the hosts takes an action to alter the IP address. Logical flows of double IP address recovery program 115 and double IP address recovery program 125 are discussed in later paragraphs with reference to FIGS. 2A, 2B, and 4.

Figure 2A:
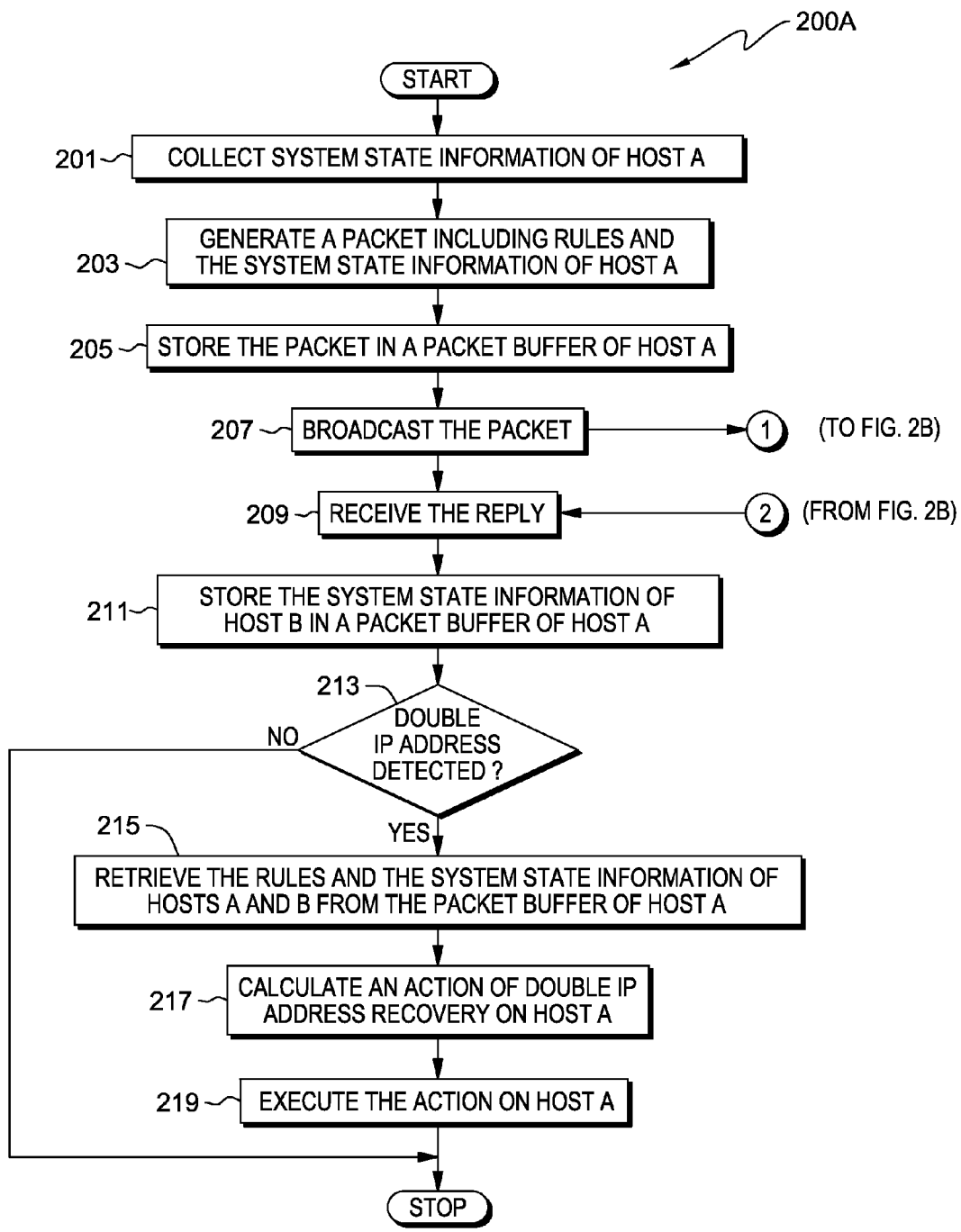
FIG. 2A is a flowchart illustrating a logical flow of a double IP address recovery program on host A shown in FIG. 1, in accordance with an exemplary embodiment of the present invention.

FIG. 2A is a flowchart illustrating logical flow 200A of double IP address recovery program 115 on host A 110 shown in FIG. 1, in accordance with an exemplary embodiment of the present invention. At step 201, double IP address recovery program 115 on host A 110 collects system state information of host A 110. In the exemplary embodiment, the system state information of host A 110 includes a state (e.g., active or passive) and a value (e.g., uptime) of host A 110.

Referring to FIG. 2A, at step 203, double IP address recovery program 115 generates a packet which includes rules of the double IP address recovery and the system state information of host A 110. The rules are used by all hosts (e.g. host A 110 and host B 120 shown in FIG. 1) in double IP address recovery. The packet is discussed in great detail in later paragraphs with reference to FIGS. 3A, 3B, 3C, and 3D.

At step 205 of FIG. 2A, double IP address recovery program 115 stores the packet in a packet buffer of host A 110. At step 207, double IP address recovery program 115 on host A 110 broadcasts the packet to host B 120. In response to step 207 of double IP address recovery program 115, double IP address recovery program 125 on host B 120 starts at point ① between logical flow 200A in FIG. 2A and logical flow 200B in FIG. 2B. After certain steps of logical flow 200 B, double IP address recovery program 125 on host B 120 sends a reply to host A 110. The reply includes system state information of host B 120. In the exemplary embodiment, the system state information of host B 120 includes a state (e.g., active or passive) and a value (e.g., uptime) of host B 120. Logical flow 200 B of double IP address recovery program 125 on host B 120 is discussed in great detail in later paragraphs with reference to FIG. 2B. In response to the reply sent by double IP address recovery program 125 on host B 120, at point ② between logical flow 200A in FIG. 2A and logical flow 200B in FIG. 2B, double IP address recovery program 115 on host A 110 continues with next steps in logical flow 200A.

Referring to FIG. 2A, at step 209, double IP address recovery program 115 on host A 110 receives the reply sent from host B 120. At step 211, double IP address recovery program 115 stores the system state information of host B 120, which is included in the reply, in the packet buffer of host A 110.

Referring to FIG. 2A, at decision block 213, double IP address recovery program 115 on host A 110 determines whether double IP address is detected. The double IP address is detected when host A 110 and host B 120 have a same IP address. In response to determining that the double IP address is not detected (a "NO" branch of decision block 213), double IP address recovery program 115 on host A 110 terminates the operation. In response to determining that the double IP address is detected (a "YES" branch of decision block 213), at step 215, double IP address recovery program 115 on host A 110 retrieves, from the packet buffer of host A 110, the rules and the system state information of hosts A 110 and B 120.

Referring to FIG. 2A, double IP address recovery program 115 on host A 110 at step 217 calculates an action of double IP address recovery on host A 110. The action is either to continue or to alter an IP address. The calculation of the action is discussed in great detail in later paragraphs with reference to FIG. 4. At step 219, double IP address recovery program 115 on host A 110 executes the action which has been calculated at step 217.

Figure 2B:
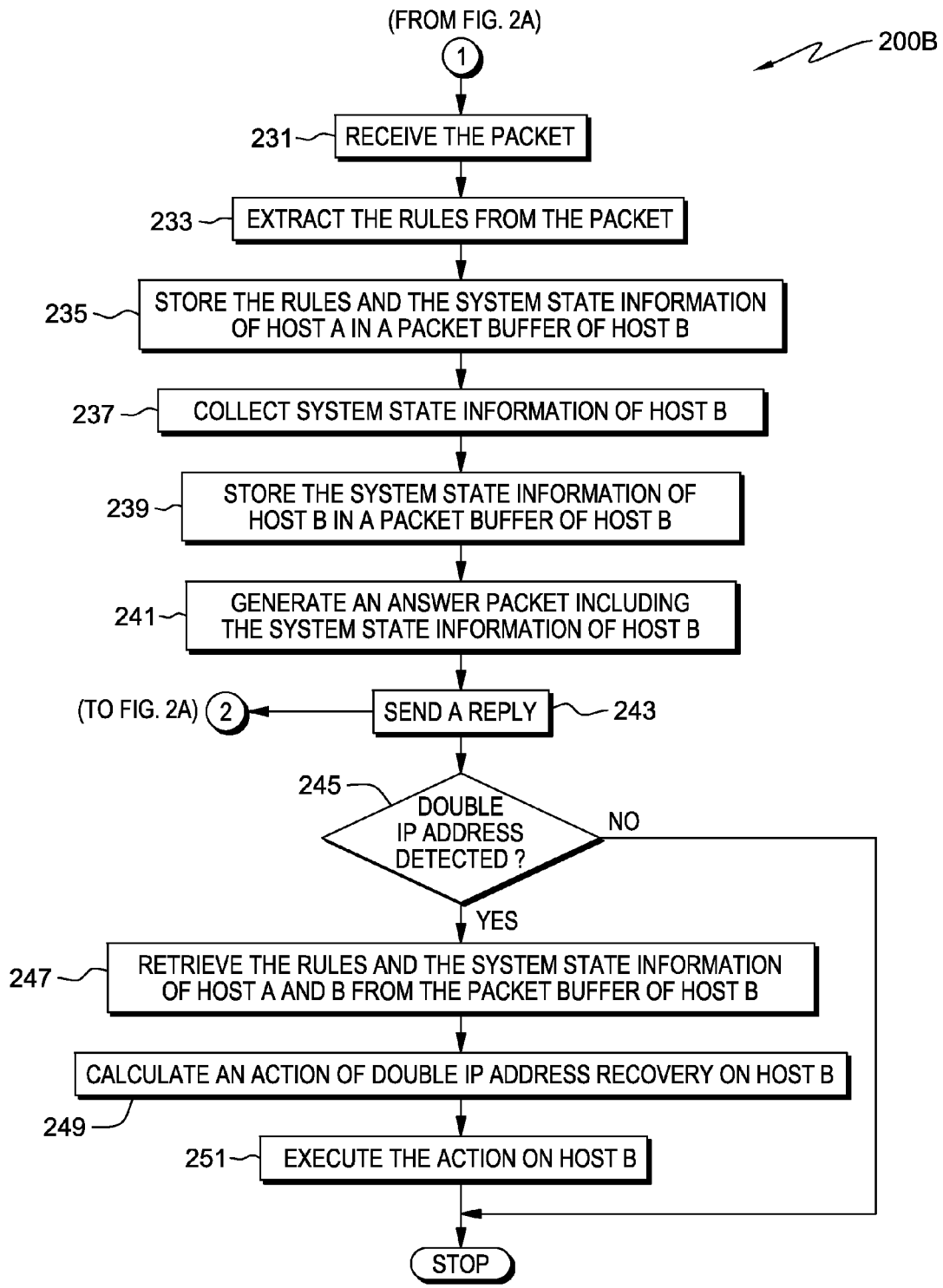
FIG. 2B is a flowchart illustrating a logical flow of a double IP address recovery program on host B shown in FIG. 1, in accordance with an exemplary embodiment of the present invention.

FIG. 2B is a flowchart illustrating logical flow 200B of double IP address recovery program 125 on host B 120 shown in FIG. 1, in accordance with an exemplary embodiment of the present invention. After step 207 of logical flow 200A shown in FIG. 2A, at point ① between logical flow 200A in FIG. 2A and logical flow 200B in FIG. 2B, double IP address recovery program 125 on host B 120 starts. At step 231 in FIG. 2B, double IP address recovery program 125 on host B 120 receives the packet, which is broadcasted (at step 207 of logical flow 200A shown in FIG. 2A) by double IP address recovery program 115 on host A 110.

Referring to FIG. 2B, at step 233, double IP address recovery program 125 on host B 120 extracts the rules in the packet. At step 235, double IP address recovery program 125 on host B 120 stores the rules and the system state information of host A 110 in a packet buffer of host B 120.

Referring to FIG. 2B, at step 237, double IP address recovery program 125 on host B 120 collects system state information of host B 120. In the exemplary embodiment, the system state information of host B 120 includes a state (e.g., active or passive) and a value (e.g., uptime) of host B 110. At step 239, double IP address recovery program 125 on host B 120 stores the system state information of host B 120 in the packet buffer of host B 120.

Referring to FIG. 2B, at step 241, double IP address recovery program 125 on host B 120 generates an answer packet, which includes the system state information of host B 120. At step 243, double IP address recovery program 125 on host B 120 sends the reply to host A 110. In the exemplary embodiment, the reply includes the system state information of host B 120. In response to step 243 of double IP address recovery program 125 on host B 120, at point ② between logical flow 200A in FIG. 2A and logical flow 200B in FIG. 2B, double IP address recovery program 115 on host B 110 continues with step 209 in logical flows 200A in FIG. 2A.

Referring to FIG. 2B, at decision block 245, double IP address recovery program 125 on host B 120 determines whether the double IP address is detected. The double IP address is detected when host A 110 and host B 120 have a same IP address. In response to determining that the double IP address is not detected (a "NO" branch of decision block 245), double IP address recovery program 125 of host B 120 terminates the operation. In response to determining that double IP address are detected (a "YES" branch of decision block 245), at step 247, double IP address recovery program 125 of host B 120 retrieves, from the packet buffer of host B 120, the rules and the system state information of hosts A 110 and B 120.

Referring to FIG. 2B, double IP address recovery program 125 of host B 120 at step 249 calculates an action of double IP address recovery on host B 120. The action is either to continue or to alter an IP address. The calculation of the action is discussed in great detail in later paragraphs with reference to FIG. 4. At step 251, double IP address recovery program 125 of host B 120 executes the action which has been calculated at step 249.

FIG. 3A shows a packet header in a packet generated by double IP address recovery program 115 on host A 110, in accordance with an exemplary embodiment of the present invention. The packet header includes version, packet type, packet identifier, byte offset for rules, byte length for rules, byte offset for the system state information, byte length for the system state information, unique host identifier, and host IP. An example of the packet header is discussed in a later paragraph with reference to FIG. 3D.

FIG. 3B shows a rule format included in a packet generated by double IP address recovery program 115 on host A 110, in accordance with an exemplary embodiment of the present invention. The rule format in the packet includes rule length, rule entry type of recovery, rule entry type of state comparison, rule entry type of value comparison. The rule entry type of recovery is an identifier; the identifier is followed by a byte containing information about recovery actions of host 0 and host 1. The rule entry type of state comparison is an identifier; the identifier is followed by a byte containing a descriptor ("state field") for a state and further by two bytes containing states for hosts (host 0 and host 1). The rule entry type of value comparison is an identifier; the identifier is followed by a byte containing a descriptor ("state field") for a value and further by a byte containing a comparison operator used for the value. An example of the rule format in the packet is discussed in later paragraphs with reference to FIG. 3D.

FIG. 3C shows a format of system state information in a packet generated by double IP address recovery program 115, in accordance with an exemplary embodiment of the present invention. The format of the system state information includes the length of the system state information ("state length" in the table shown in FIG. 3C), four bytes of "value", four bytes of "fuzziness", and any bytes of "state identifier". For example, the "value" for a state (e.g. active or passive) is 1 or 0, and the "value" for a value (e.g. uptime) is actual time elapsed since the host starts. The "fuzziness" is a key to the operation of the algorithm; it enables and ensures the validity of the comparison of the "value". For example, in a case of two hosts starting at the same time, one of the two hosts measures and transmits its own uptime, but the other one of the two hosts measures its own uptime at a later time. Due to the latency of the transmission, the two hosts that actually start at the same time have two different uptimes. Without considering the fuzziness, the two different uptimes are used in evaluating the rules. Therefore, the fuzziness should be considered. The fuzziness value is a carefully chosen value that offsets the uptime difference due to the latency of the transmission. The "state identifier" can be any string ending with '\0'; the length of the string can be any bytes. An example of the format of the system state information in the packet is discussed in later paragraphs with reference to FIG. 3D.

FIG. 3D shows an example of a packet generated by double IP address recovery program 115 on host A 110, in accordance with an exemplary embodiment of the present invention. The first row (byte 0 to byte 20) in FIG. 3D shows an example of the packet header shown in FIG. 3A. The example of the packet header is as follows. The version is "1", the packet type is "broadcast", and packet identifier is "4320". The byte offset for rules is "21" bytes and the byte length for rules is "13" bytes. The byte offset for the system state information is "34" bytes and the byte length for the system state information is "30" bytes. The unique host identifier is "AA:BB:CC:DD:EE:FF" and the host IP is "192.168.0.1".

Referring to FIG. 3D, the second row (byte 21 to byte 33) shows an example of the rule format shown in FIG. 3B. Byte 21 presents the "rule length" in the rule format shown in FIG. 3B; the "rule length" in the example is "7" bytes. Byte 22 presents the identifier of the "rule entry type of state comparison" in the rule format shown in FIG. 3B; the identifier in the example is "state". The following byte (byte 23) presents the descriptor of the "state field" in the rule format shown in FIG. 3B; the value of "1" is a numerical identifier for a state. The further following bytes (bytes 24 and 25) presents values for the state of active ("1") on host 0 and passive ("0") on host 1. Byte 26 presents the identifier of the "rule entry type of recovery" in the rule format shown in FIG. 3B; the identifier in the example is "recovery". A following byte (byte 27) presents recovery actions: "continue" on host 0 and "reboot" on host 1. The rule format given in bytes 21 to 27 sets a rule as: state of host 0=active && state of host 1=passive→host 0=continue && host 1=reboot.

Referring to the second row in FIG. 3D, byte 28 presents the "rule length" in the rule format shown in FIG. 3B; the "rule length" in the example is "6" bytes. Byte 29 presents the identifier of the "rule entry type of value comparison" in the rule format shown in FIG. 3B; the identifier in the example is "value". The following byte (byte 30) presents the descriptor of the "state field" in the rule format shown in FIG. 3B; the value of "2" is a numerical identifier for a value (in the example, it is an uptime). Byte 31 presents "smaller than" as the "comparison operator" shown in FIG. 3B. Byte 32 presents the identifier of the "rule entry type of recovery" in the rule format shown in FIG. 3B; the identifier in the example is "recovery". A following byte (byte 33) presents recovery actions: "reboot" on host 0 and "continue" on host 1. The rule format given in bytes 28 to 33 sets a rule as: state of host 0=active && state of host 1=active && uptime of host 0<uptime of host 1→host 0=reboot && host 1=continue.

Referring to FIG. 3D, byte 34 to byte 47 in the third row shows an example of the format (shown in FIG. 3C) of the system state information. Byte 34 presents the "state length" shown in FIG. 3C; the value of the "state length" is "14" bytes. Bytes 35 to 38 present a value of a state; the value of the state is "1" indicating "active". Bytes 39 to 42 present the "fuzziness" shown in FIG. 3C; the value of the "fuzziness" for the state is "0". Bytes 43 to 47 present the "state identified" shown in FIG. 3C; the "state identifier" in this example is "role\0".

Referring to FIG. 3D, byte 48 to byte 63 in the third row shows another example of the format (shown in FIG. 3C) of the system state information. Byte 48 presents the "state length" shown in FIG. 3C; the value of the "state length" is "16" bytes. Bytes 49 to 52 present a value of the uptime; the value of the uptime is "104367". Bytes 53 to 56 present the "fuzziness" shown in FIG. 3C; the value of the "fuzziness" for the uptime is "200". Bytes 57 to 63 present the "state identified" shown in FIG. 3C; the "state identifier" in this example is "uptime\0".

Figure 4:
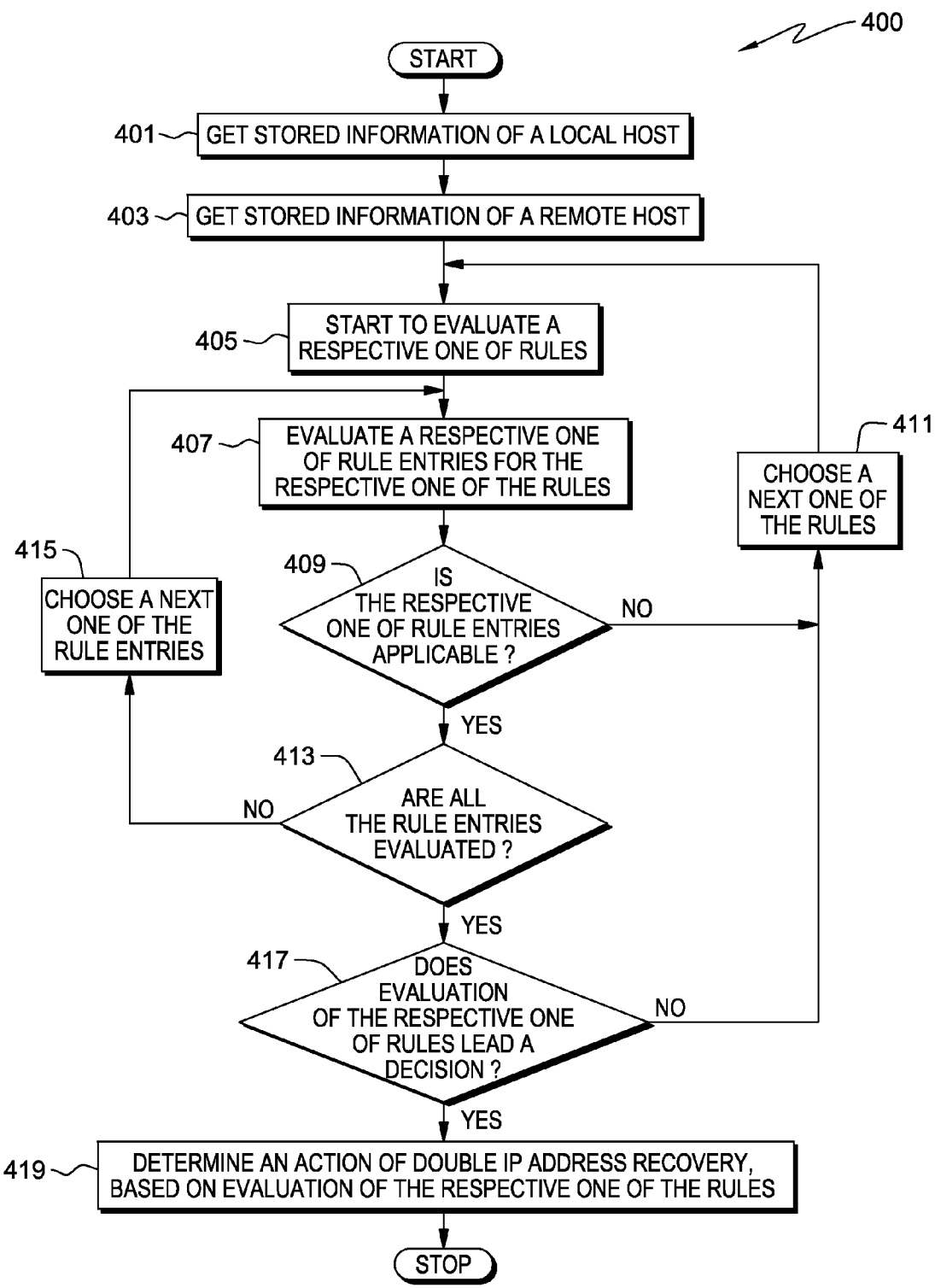
FIG. 4 is a flowchart illustrating a logical flow of calculating an action of double IP address recovery, in accordance with an exemplary embodiment of the present invention.

FIG. 4 is a flowchart illustrating logical flow 400 of calculating an action of double IP address recovery, in accordance with an exemplary embodiment of the present invention. Logical flow 400 in FIG. 4 is exemplary implementation of step 217 shown in FIG. 2A and step 249 shown in FIG. 2B. In the exemplary embodiment, logical flow 400 is implemented by double IP address recovery program 115 on host A 110 and double IP address recovery program 125 on host B 120.

Referring to FIG. 4, at step 401, double IP address recovery program 115 or 125 gets stored information of a local host. At this step, double IP address recovery program 115 on host A 110 gets the stored information of host A 110 from the packet buffer on host A 110; IP recovery program 125 on host B 120 gets the stored information of host B 120 from the packet buffer on host B 120.

At step 403, double IP address recovery program 115 or 125 gets stored information of a remote host. At this step, double IP address recovery program 115 on host A 110 gets the stored information of host B 120 from the packet buffer on host A 110; IP recovery program 125 on host B 120 gets the stored information of host A 110 from the packet buffer on host B 120.

At step 405, double IP address recovery program 115 or 125 starts to evaluate a respective one of rules. At step 407, double IP address recovery program 115 or 125 evaluates a respective one of rule entries of the respective one of the rules. At decision block 409, double IP address recovery program 115 or 125 determines whether the respective one of the rule entries is applicable. In response to determining that the respective one of the rule entries is not applicable (a "NO" branch of decision block 409), double IP address recovery program 115 or 125 at step 411 chooses a next one of the rules and then reiterates from step 405. In response to determining that the respective one of the rule entries is applicable (a "YES" branch of decision block 409), double IP address recovery program 115 or 125 at decision block 413 determines whether all the rule entries are evaluated. In response to determining that not all the rule entries are evaluated (a "NO" branch of decision block 413), double IP address recovery program 115 or 125 chooses a next one of the rule entries at step 415 and then reiterates from step 407. In response to determining that all the rule entries are evaluated (a "YES" branch of decision block 413), double IP address recovery program 115 or 125 at decision block 417 determines whether the evaluation of the respective one of rules leads to a decision for an action of double IP address recovery. In response to determining that the evaluation of the respective one of rules does not lead to the decision (a "NO" branch of decision block 417), double IP address recovery program 115 or 125 chooses a next one of the rules at step 411 and then reiterates from step 405. In response to determining that the evaluation of the respective one of rules leads to the decision (a "YES" branch of decision block 417), double IP address recovery program 115 or 125 at step 419 determines an action of double IP address recovery, based on the evaluation of the respective one of rules.

Figure 5:
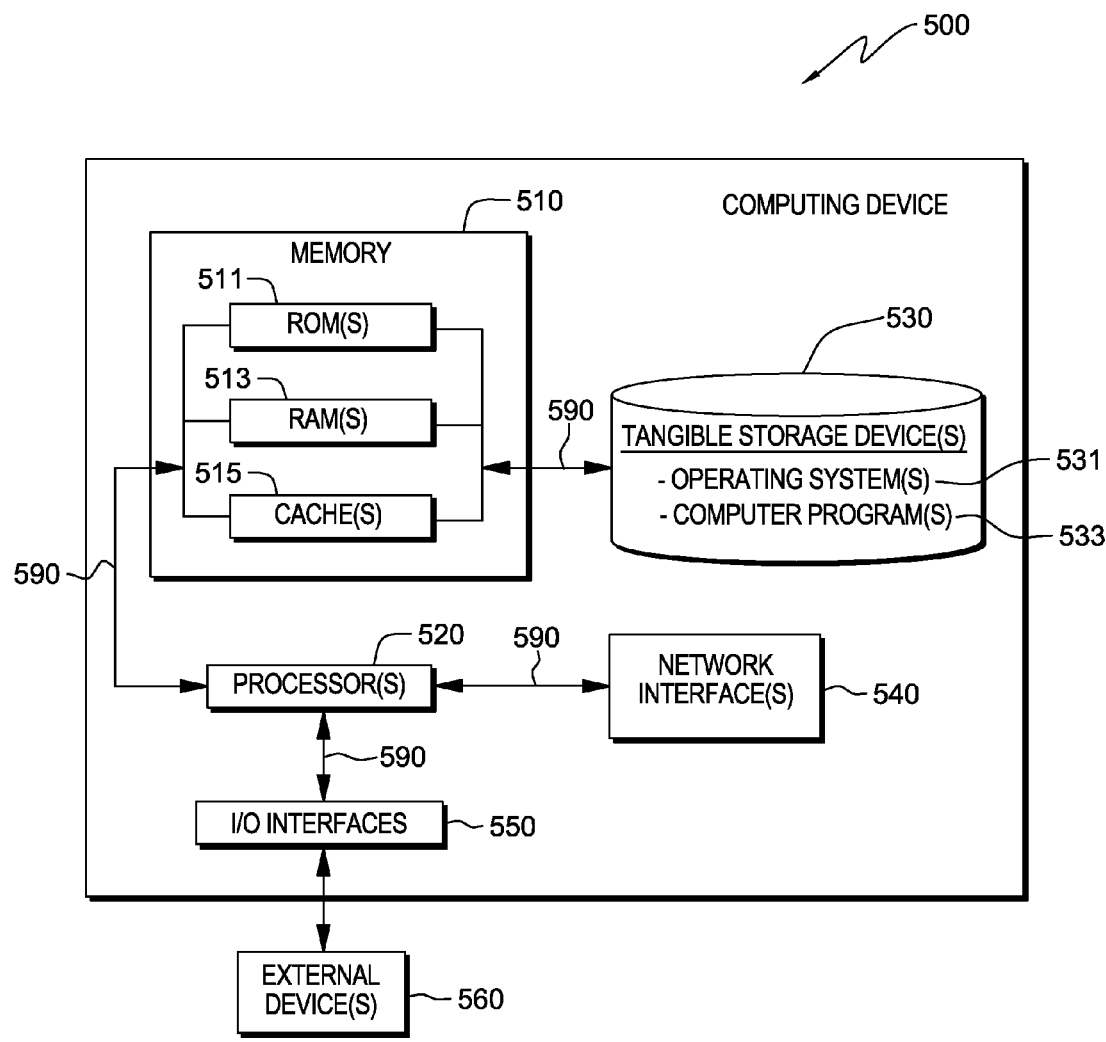
FIG. 5 is a diagram illustrating components of a computing device of host A or host B shown in FIG. 1, in accordance with an exemplary embodiment of the present invention.

FIG. 5 is a diagram illustrating components of a computing device of host A 110 or host B 120 shown in FIG. 1, in accordance with an exemplary embodiment of the present invention, in accordance with an exemplary embodiment of the present invention. It should be appreciated that FIG. 5 provides only an illustration of one implementation and does not imply any limitations with regard to the environment in which different embodiments may be implemented.

Referring to FIG. 5, computing device 500 includes processor(s) 520, memory 510, tangible storage device(s) 530, network interface(s) 540, and I/O (input/output) interface(s) 550. In FIG. 5, communications among the above-mentioned components of computing device 500 are denoted by numeral 590. Memory 510 includes ROM(s) (Read Only Memory) 511, RAM(s) (Random Access Memory) 513, and cache(s) 515.

One or more operating systems 531 and one or more computer programs 533 reside on one or more computer-readable tangible storage device(s) 530. In the exemplary embodiment, double IP address recovery program 115 resides on one or more computer-readable tangible storage device(s) 530 of host A 110; double IP address recovery program 125 resides on one or more computer-readable tangible storage device(s) 530 of host A 110.

Computing device 500 further includes I/O interface(s) 550. I/O interface(s) 550 allow for input and output of data with external device(s) 560 that may be connected to computing device 500. Computing device 500 further includes network interface(s) 540 for communications between computing device 500 and a computer network.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, and micro-code) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF (radio frequency), and any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for double IP address recovery, wherein double IP address is a situation of a same IP address for both a first host and a second host, wherein the double IP address recovery resolves the double IP address, the method comprising steps:
   collecting, by the first host, system state information of the first host, wherein the system state information of the first host includes a state of the first host and a value of the first host, wherein the state of the first host is one of active and passive states, wherein the value of the first host is uptime of the first host;
   generating, by the first host, a packet, the packet comprising rules of the double IP address recovery, the system state information of the first host, and a fuzziness value, wherein the fuzziness value offsets uptime difference due to transmission latency;
   storing, by the first host, in a packet buffer on the first host, the packet;
   broadcasting, by the first host, the packet to the second host;
   receiving, by the first host, an answer packet from the second host, the answer packet comprising system state information of the second host, wherein the system state information of the second host includes a state of the second host and a value of the second host, wherein the state of the second host is one of active and passive states, wherein the value of the second host is uptime of the second host;
   storing, by the first host, in the packet buffer on the first host, the system state information of the second host;
   determining, by the first host, whether the double IP address is detected;
   retrieving, by the first host, from the packet buffer on the first host, the rules, the system state information of the first host, and system state information of the second host, in response to determining that the double IP address is detected;
   determining, by the first host, an action of the double IP address recovery on the first host, based on the rules of the double IP address recovery, the system state information of the first host, and system state information of the second host; and
   executing, by the first host, the action on the first host.

2. The computer-implemented method of claim 1, wherein the action of the double IP address recovery on the first host is either to continue or alter an IP address of the first host.

3. The computer-implemented method of claim 1, further comprising steps:
   receiving, by the second host, the packet from the first host;
   extracting, by the second host, from the packet, the rules of the double IP address recovery and the system state information of the first host;
   storing, by the second host, in a packet buffer on the second host, the rules and the system state information of the first host;
   collecting, by the second host, the system state information of the second host;
   storing, by the second host, in the packet buffer on the second host, the system state information of the second host;
   generating, by the second host, the answer packet;
   sending, by the second host, the answer packet to the first host;
   determining, by the second host, whether the double IP address is detected;
   retrieving, by the second host, from the packet buffer on the second host, the rules, the system state information of the first host, and system state information of the second host, in response to determining that the double IP address is detected;
   determining, by the second host, an action of the double IP address recovery on the second host, based on the rules of the double IP address recovery and the system state information of the first host, and system state information of the second host; and executing, by the second host, the action on the second host.

4. The computer-implemented method of claim 3, wherein the action of the double IP address recovery on the second host is either to continue or alter an IP address of the second host.

5. The computer-implemented method of claim 1, wherein the rules of double IP address recovery comprise comparison of the state of the first host and the state of the second host and comparison of the value of the first host and the value of the second host, and wherein the fuzziness value is used in the comparison of the value of the first host and the value of the second host.

* * * * *